United States Patent [19]

Boubehira et al.

[11] Patent Number: 5,356,598
[45] Date of Patent: Oct. 18, 1994

[54] CATALYTIC EXHAUST UNIT FOR AN AUTOMOBILE VEHICLE

[76] Inventors: Mohamed Boubehira, 205 Avenue Franklin Roosevelt, 69500 Bron; Omar Chouchou, 10 Chemin de la Perivaure, 42700 Firminy; Alain Bourgin, 19 rue Gauthier-dumont, 42100 Saint-Etienne; Nadir Abdechakour, Le Forum, 42000 Saint-Etienne, all of France

[21] Appl. No.: 842,978

[22] Filed: Feb. 28, 1992

Related U.S. Application Data

[63] Continuation-in-part of Ser. No. 475,323, Feb. 5, 1990, abandoned.

[30] Foreign Application Priority Data

Feb. 16, 1989 [FR] France .................. 89 02370

[51] Int. Cl.$^5$ .................................... B01D 53/36
[52] U.S. Cl. .................... 422/180; 422/177; 60/295
[58] Field of Search ............ 422/170, 171, 177, 180, 422/311; 60/281, 282, 295, 299; 55/DIG. 30, 76, 179, 525; 502/927, 345

[56] References Cited

U.S. PATENT DOCUMENTS

| | | | |
|---|---|---|---|
| 3,003,810 | 10/1961 | Kloote et al | 296/181 |
| 3,206,414 | 9/1965 | Gunther | 502/331 |
| 3,299,620 | 1/1967 | Hollingworth | 422/122 |
| 3,656,915 | 4/1972 | Tourtellotte | 422/171 |
| 3,709,772 | 7/1972 | Rice | 138/146 |
| 3,785,781 | 1/1974 | Hervert et al. | 60/299 X |
| 3,810,361 | 5/1974 | Weaving et al. | 422/171 X |
| 3,900,429 | 8/1975 | Komatsu et al. | 423/213.2 X |
| 4,032,310 | 6/1977 | Ignoffo | 55/276 |
| 4,206,184 | 6/1980 | Chen | 502/245 |
| 4,345,430 | 8/1982 | Pallo et al. | 60/282 |
| 4,362,016 | 12/1982 | Papadopulos | 60/297 |
| 4,894,987 | 1/1990 | Harwood et al. | 60/299 |
| 5,009,857 | 4/1991 | Haerle | 422/177 X |

FOREIGN PATENT DOCUMENTS

| | | |
|---|---|---|
| 171624 | 2/1986 | European Pat. Off. . |
| 2226761 | 12/1972 | Fed. Rep. of Germany . |
| 2333816 | 10/1974 | Fed. Rep. of Germany . |
| 2555038 | 6/1977 | Fed. Rep. of Germany . |
| 3210697 | 11/1982 | Fed. Rep. of Germany . |
| 3708696 | 9/1988 | Fed. Rep. of Germany . |
| 8810319 | 11/1988 | Fed. Rep. of Germany . |
| 2267448 | 11/1975 | France . |
| 2589786 | 5/1987 | France . |
| 0418790 | 4/1933 | United Kingdom . |
| 1107550 | 3/1968 | United Kingdom . |
| 1459632 | 12/1976 | United Kingdom . |

*Primary Examiner*—Timothy M. McMahon
*Attorney, Agent, or Firm*—Oliff & Berridge

[57] ABSTRACT

A catalytic exhaust unit for an automobile vehicle intended for the chemical treatment of a gaseous mixture in contact with a catalytic material. The exhaust unit includes a body with an entry and an exit for the flow of a gaseous mixture. The interior of the body includes two successive compartments. A filtering material is arranged in the first compartment, and a treatment receptacle is arranged in the second compartment. A mass of catalytic material, permeable to the passage of the gaseous mixture is arranged in the receptacle. The catalytic material is in solid form and includes an active substance consisting of metals and obtained by partial sintering. The mass of the catalytic material is arranged in a succession of at least two catalyst beds in the direction of flow of the gaseous mixture. The first bed includes copper as an active substance, and each of the other beds includes, by way of an active substance, at least one metal chosen from among copper, iron, nickel, cobalt, cadmium, and chromium.

15 Claims, 2 Drawing Sheets

CATALYTIC EXHAUST UNIT FOR AN AUTOMOBILE VEHICLE

This is a continuation-in-part of U.S. application Ser. No. 07/475,323 now abandoned.

BACKGROUND OF THE INVENTION

The present invention relates to a catalytic exhaust unit or muffler, intended for the treatment of exhaust gases from an internal combustion heat engine, that is to say to the chemical conversion, in the presence of appropriate catalytic materials, of said gases comprising various pollutants and especially sulfur dioxide, nitrogen oxides, uncombusted hydrocarbons, carbon monoxide and carbon dioxide.

DESCRIPTION OF THE PRIOR ART

In accordance with the document U.S. Pat. No. 5,009,857, a reactor has been proposed for treating a gaseous mixture and in particular exhaust gases from an internal combustion engine, comprising a treatment receptacle, situated downstream of the collector of said gases, in which is arranged a filtering and catalytic mass. The latter consists of a succession of treatment beds which are permeable to the passage of the gaseous mixture, between which are formed ducts for the flow of the gases. Said filtering and catalytic mass can be fashioned by sintering, and comprises, by way of an active catalytic substance, metals which are chosen especially from among chromium, molybdenum, nickel, manganese, platinum, rhodium, vanadium, and palladium. With at least two treatment beds acting on different pollutant constituents of the combustion gases, the known reactors such as that described above make it possible to improve the decontamination of said gases and thus to limit the discharge of toxic substances into the atmosphere.

One problem which is not resolved by such reactors is that of the discharge of carbon dioxide resulting from the combustion of hydrocarbons, in the combustion engine and possibly the post-combustion or decontamination catalytic unit. Every year, the $CO_2$ accumulates in the atmosphere in greater concentration; it is the agent responsible for the greenhouse effect which nowadays constitutes the principle cause of the risks of climatic disturbances and especially global warming.

SUMMARY OF THE PRESENT INVENTION

The subject of the present invention is an exhaust unit which can complement or even replace known catalytic units, while acting on the $CO_2$ contained in the exhaust gases.

This exhaust unit is constituted by a body, especially a cylindrical body, and by two upstream and downstream closure plates, respectively incorporating the entry and exit of said unit. The interior of the cylindrical body is constituted by two successive compartments, from the entry to the exit of the unit, a filtering material being arranged in the first compartment, and a treatment receptacle containing a mass of a catalytic material being arranged in the second compartment.

The catalytic material incorporates the following essential technical characteristics, taken in combination:

the catalytic material in solid form is constituted by an active catalytic substance consisting of metals, with the exception of any metallic oxide, and can be fashioned by partial sintering;

the mass of the catalytic material is arranged in a succession of at least two catalyst beds, each of the beds comprising, by way of an active substance, at least one metal chosen from among copper, iron, nickel, cobalt, cadmium and chromium;

the first of said beds, in the direction of passage of the gaseous mixture from the entry towards the exit, comprises, by way of an active substance, only copper.

Surprisingly, it has been noted that an exhaust unit exhibiting such characteristics makes it possible at the same time to treat, at least partially, the uncombusted hydrocarbons and the carbon monoxide, even in the absence of oxygen, and the nitrogen oxides, and to reduce the carbon dioxide emissions. This reduction of the discharge of $CO_2$ is, in addition, accompanied by an increase in the oxygen content of the gases which are finally discharged into the atmosphere.

In order to attain the best possible conversion efficiencies, the nature of the active substance and the arrangements of the catalyst beds which follow are preferable.

From and including the second catalyst bed, in the direction of passage of the gaseous mixture from the entry towards the exit, the active substance of the catalyst beds comprises at least two metals and it is shaped in at least two layers, constituted respectively by at least one of the metals in the pure state, and by a mixture of the two metals.

Advantageously, the metals constituting the active substance of the first layer of the second bed are chosen from among copper, nickel, iron and cadmium, and the mixtures of metals of the second layer of the second bed comprise at least copper and nickel.

When the mass of the catalytic material is arranged into two catalyst beds, the active substance of the second bed is preferably constituted by at least three layers, respectively of copper in the pure state, nickel in the pure state, and a mixture of copper and nickel.

When the mass of catalytic material is arranged into at least three catalyst beds, the mixtures of metals contained in the active substance of the third bed comprise at least copper or iron.

When the mass of catalytic material is arranged into at least four catalyst beds, the mixtures of metals contained in the active substance of the fourth bed comprise at least iron or nickel.

According to a preferred exhaust unit of the invention, the mass of the catalytic material is arranged into six beds, the active substance of the second bed being constituted, in the direction of flow of the gases, by a layer of copper in the pure state and a layer of a copper-nickel mixture, that of the third bed being constituted by a layer of iron in the pure state, a layer of a copper-nickel mixture, and a layer of an iron-nickel mixture, that of the fourth bed being constituted by a layer of iron in the pure state, a layer of an iron-nickel mixture and a layer of an iron-cadmium mixture, that of the fifth bed being constituted by a layer of nickel in the pure state, a layer of an iron-cadmium mixture and a layer of an iron-cobalt mixture, and that of the sixth bed being constituted by a layer of cadmium in the pure state, a layer of cobalt in the pure state, a layer of a nickel-cadmium mixture and a layer of a nickel-cobalt mixture.

In order to improve conversion efficiencies of the uncombusted hydrocarbons, of the carbon monoxide and the nitrogen oxides, the active substance of the catalyst beds can additionally comprise at least one noble metal chosen from among platinum, palladium and rhodium.

The mass of catalytic material deposited in the treatment receptacle is obtained by a partial sintering of the active substance, including a partial sintering of the different layers with each other, leaving, in the latter, open passages or pores, for the internal flow of the gaseous mixture to be treated in contact with the surface of the active substance.

The catalytic material advantageously is in the form of particles, such as grains, granules or pellets. This morphology makes it possible to multiply the active catalysis sites and thus to improve the efficiency of the active catalytic substance.

The various catalyst beds are separated from one another, which can be done by grids or any other partitioning means, and their arrangement for constituting the mass of catalytic material is in the form of a stacking of the beds or any other juxtaposition of said beds.

The wall of the reactor and/or that of the treatment receptacle are made in the form of a plastic sandwich comprising, from the outside inwards, an outer skin made of an impact-resistant laminate, a core of fire-resistant plastic foam, and an inner skin of a laminate which is resistant to corrosion, especially at high temperatures.

Such a sandwich or composite structure brings good thermal insulation, and also good thermal inertia, placing the catalytic material together in an area of relatively greater temperature, of the order of 300° to 400° C., which is favorable to an optimum efficiency of the chemical reactions of conversion. For the same reasons, such a structure allows the near-immediate activation of the catalytic substance, under the influence of the substantial heat of the exhaust gases.

The exhaust unit according to the invention can advantageously be implemented according to the following configurations;

the treatment receptacle constitutes a consumable and interchangeable cartridge, according to or as a function of the level of inactivation of the catalytic material contained by said cartridge;

the catalytic unit is arranged so as to allow access to said cartridge, and to replace a used cartridge with a new cartridge, with this closing the unit.

For complete decontamination of the gaseous mixture to be processed, the exhaust unit can be placed after a known catalytic unit of the state of the technology, in the direction of the outflow of the gases.

BRIEF DESCRIPTION OF THE DRAWINGS

The present invention is now described by reference to the attached drawings, in which.

DESCRIPTION OF THE PREFERRED EMBODIMENTS

Figure 1:
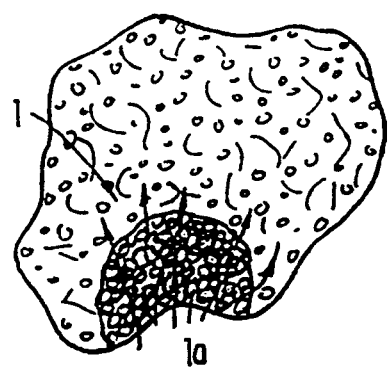
FIG. 1 shows on a large scale, one grain of a catalytic material in accordance with the invention, with a partial cut-away showing the internal structure of said material.

In accordance with FIG. 1, the catalytic material according to the invention is in solid, but divided, form, for example in the form of particles or grains (1). Each grain or particle (1) is constituted for the most part, and in bulk, by the catalytically active substance. This substance, in the pure state or in mixture, is at least one product chosen from the group comprising iron, nickel, copper, cobalt, chromium, and cadmium. The catalytically active substances, adopted according to the present invention, can be fashioned by sintering, and each grain (1) of the catalytic material is obtained by a partial sintering of the active substance, leaving open passages or pores (1a) existing in the latter, subsequently permitting an internal flow of the gaseous mixture to be treated, in contact with the inner surface of the active substance constituting the grains (1). Consequently, according to the invention, it is the whole of the substrate of the grains (1) which is constituted by the catalytic active substance, and not only the inner, developed surface of the grains (1).

The grains (1) are preferably obtained by sintering of powders having particles of less than 60 $\mu$m, and lying in particular between 0.1 and 10 $\mu$m.

The catalytic material according to the invention thus has, according to the foregoing description, the consistency or texture of a solid powder, that is to say of a pulverulent material, as much on the surface as in the bulk, whose various grains or particles are partly melted or welded to one another, thus providing the whole with rigidity, or mechanical strength; without the partial sintering this material would have no rigidity or consistency. However, this partial sintering does not substantially alter the morphology or the structure of the starting powder, in the sense that practically (for example to within 20%) the same number of catalytically active sites are still present in the partially sintered material as those existing earlier in the starting powder.

This partial sintering is obtained according to the usual techniques, in the absence of any oxidizing atmosphere, and especially under an inert or reducing atmosphere, but while controlling the conditions of temperature and pressure, so as not to modify the physical properties such as the morphology or internal structure of the catalytic substance. For example, the sintering is partial in the sense that the temperature will be limited to 300° C., and the pressure to 20 bars.

The partially sintered powders according to the invention may comprise, in addition to the catalytically active substance, various other elements or products, inert or otherwise with respect to the catalyzed chemical treatment, as long as said elements or products are capable of being sintered with the catalytically active substance; thus silica can be mixed with the powder to be sintered.

Figure 2:
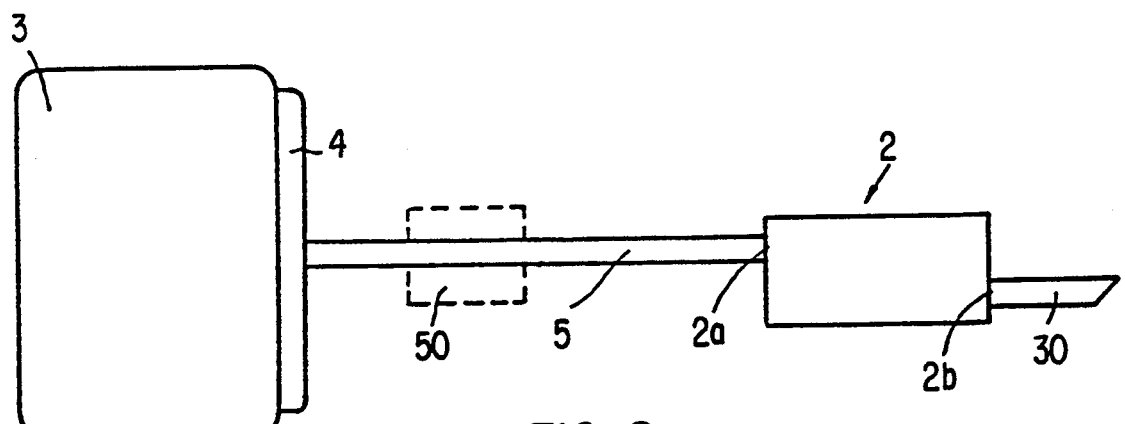
FIG. 2 shows schematically an automobile vehicle equipped with an exhaust unit according to the invention.

In accordance with FIG. 2, the exhaust gases are collected at the exit from the engine (3) in a collector (4), sent through a pipework (5) to the entry (2a) of the exhaust unit (2) of the invention, and removed after chemical treatment at the exit (2b) from the unit (2), by the pipe (30). Possibly, and as shown in dotted lines according to reference (50), a conventional catalytic unit may appear between the collector (4) and the exhaust unit (2) according to the invention.

The exhaust unit (2) is delimited by a wall composed of a cylindrical body (6), and of two closure plates upstream (7) and downstream (8), respectively incorporating the entry (2a) and the exit (2b). The plates (7) and (8) are arranged, for example by means of appropriate screws and threads, so as to be removable with respect to the body (6), and thus to permit access to the interior of the latter.

Figure 3:
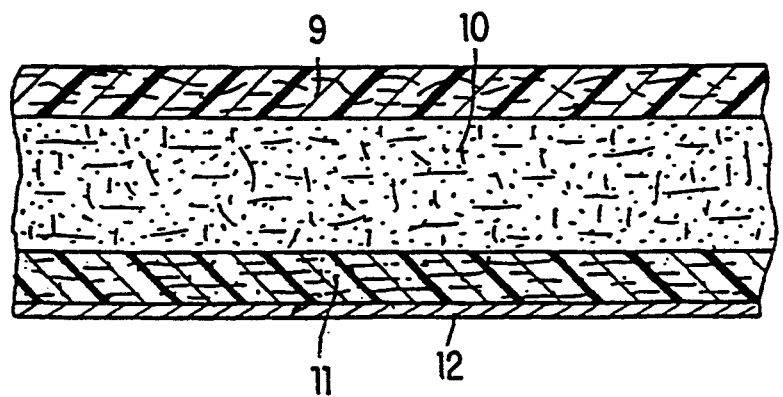
FIG. 3 shows, in transverse section, the wall of an exhaust unit according to the present invention.

The wall constituted by the body (6) and the plates (7) and (8), can be produced in composite materials such as those shown in FIG. 3. It involves a plastic sandwich comprising from the outside inwards:

an outer skin (9) having impact-resistant properties, constituted by a laminate of an appropriate resin, in which reinforcing fibers are incorporated; the impact strength of the laminate obtained is preferably at least equal to 50 kJ/m$^2$;

a core (10) in fire-resistant plastic foam, for example made of modified phenolic foam, having good vibration-damping properties;

an inner skin (11) made of laminate, for example made of epoxy vinyl ester, reinforced by inert fibers, having good resistance to the corrosion due to the exhaust gases, including at high temperatures;

possibly, a supplementary inner lining (12), providing or reinforcing the protection against corrosion, such as silicones or a fluorinated polymer.

The reinforcing fibers may be of any kind, as long as they are inert in relation to the resin which they reinforce. They may be long or short fibers, filaments, cloths or mats, particularly of glass fiber.

A particularly light exhaust unit body is thus obtained, having a density for example of less than 1.9 g/cm$^3$, and exhibiting very good thermal insulation and inertia properties, which favor the chemical reactions taking place in the unit (2). The interior of the unit (2) is constituted by two successive compartments (13) and (14), from the entry (2a) to the exit (2b).

Figure 4:
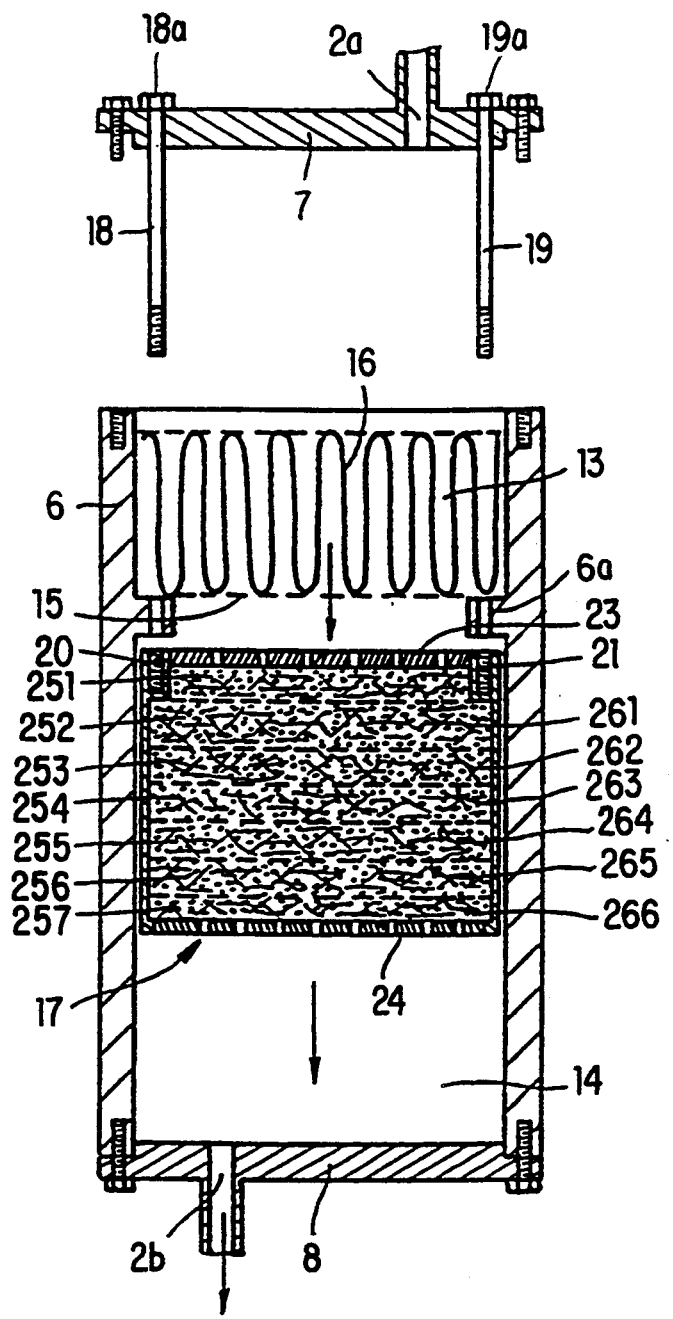
FIG. 4 shows, in axial section, an exhaust unit, according to the invention, with outflow parallel to the axis of said unit.

In accordance with FIG. 4, the first compartment (13) is bounded, on one side by a shoulder (6a) belonging to the cylindrical body (6), on which a grid (15) rests, and on the other side by the closure plate (7). Inside this compartment is arranged a filtering material (16), in the form of a felt, for example of glass wool, formed into consecutive and adjacent folds. The material (16) serves, not only to filter and retain the particles in suspension in the exhaust gases, but also to slow down the latter, while damping the noise associated with the exhaust of the engine (3).

The second compartment (14) comprises a replaceable cartridge (17), or catalytic treatment enclosure proper. This cartridge is held in a manner allowing it to be removed from the closure plate (7), by virtue of screws (18) and (19) whose stems pass through appropriate holes in the plate (7) and in the shoulder (6a), in order to interact with threads (20) and (21) provided on the cartridge (17). As a result, by unscrewing the screws (18) and (19) by manipulation of their heads (18a) and (19a) with a tool, and by opening the closing plate (8), it is possible to gain access to the cartridge (17), and to extract it from the body (6).

The cartridge proper (17) is composed of composite plastic materials, such as described above with reference to FIG. 3, by assembling and adhesively bonding a cylindrical body (22), and by two perforated circular plates for entry (23) and for exit (24). Within the cartridge, the mass of catalytic material is arranged into several beds (251 to 257) of particles of the catalytic material according to FIG. 1, separated from each other by grids (261 to 266).

By way of a variant, the various beds (251 to 257) of the cartridge (17) can be replaced by a stack of cakes, separated as above by grids (261 to 266).

In accordance with FIG. 4, the mass of the catalytic material is arranged into six beds (251 to 256) whose active substances are respectively constituted by:

bed 251: (Cu)
bed 252: (Cu)+(Cu—Ni) mixture
bed 253: (Fe)+(Cu—Ni), (Fe—Ni) mixtures
bed 254: (Fe)+(Fe—Ni), (Fe—Cd) mixtures
bed 255: (Ni)+(Fe—Cd), (Fe—Co) mixtures
bed 256: (Cd), (Co)+(Ni—Cd), (Ni—Co) mixtures Tables 1 and 2 below display the performance characteristics of an exhaust unit according to the invention incorporating the reactor described in FIG. 4. The trials were carried out on a Renault 19 GTS automobile vehicle. The percentages express the concentration of the different constituents of the combustion gases, at the exit from the exhaust unit.

TABLE 1

| | Stabilized speeds | CO in % | CO$_2$ in % | HC in ppm (C$_3$H$_8$) | NOx in ppm | O$_2$ in % |
|---|---|---|---|---|---|---|
| With the original and conventional exhaust of the vehicle, and without catalytic unit | 15 km/h (2170 rev/min) | 0.31 | 14.3 | 810 | 364 | 1.5 |
| | 32 km/h (2580 rev/min) | 0.32 | 14.2 | 654 | 756 | 1.7 |
| | 50 km/h (2600 rev/min) | 0.25 | 14.1 | 669 | 1774 | 1.8 |
| | 35 km/h (1830 rev/min) | 0.26 | 14.3 | 705 | 626 | 1.6 |
| With the exhaust unit according to the invention | 15 km/h (2170 rev/min) | 0.24 | 11.1 | 538 | 314 | 5.8 |
| | 32 km/h (2580 rev/min) | 0.21 | 11.3 | 412 | 637 | 5.6 |
| | 50 km/h (2600 rev/min) | 0.17 | 11.2 | 464 | 1530 | 5.7 |
| | 35 km/h (1830 rev/min) | 0.19 | 11.0 | 555 | 530 | 6.0 |

TABLE 2

| | Engine speeds | CO in % | CO$_2$ in % | HC in ppm | NOx in ppm | O$_2$ in % |
|---|---|---|---|---|---|---|
| With the original and conventional exhaust of the vehicle and without the catalytic unit | idling (780 rev/min) | 2.40 | 13.3 | — | 74 | 0.9 |
| | (2170 rev/min) | 0.31 | 14.4 | 777 | 275 | 1.3 |
| | (2580 rev/min) | 0.36 | 14.4 | 545 | 402 | 1.4 |
| | (1830 rev/min) | 1.25 | 14.4 | 1327 | 187 | 0.4 |
| With the exhaust unit according to the invention | idling (780 rev/min) | 1.60 | 10.0 | 1664 | 56 | 6.1 |
| | (2170 rev/min) | 0.27 | 11.2 | 702 | 217 | 5.6 |
| | (2580 rev/min) | 0.28 | 11.3 | 551 | 319 | 5.6 |
| | (1830 rev/min) | 0.76 | 11.6 | 1052 | 160 | 4.8 |

Table 3 below shows the results obtained with a Renault 21 TL automobile vehicle equipped with an exhaust unit incorporating a cartridge in which the mass of the catalytic material is arranged into six catalyst beds as follows:

first bed: (Cu)+(Cu—Ni), (Fe, Ni) mixtures
second bed: (Fe)+(Cu—Ni), (Fe—Ni), (Fe—Co) mixtures
third bed: (Cu)
fourth bed: (Fe)+(Fe—Ni), (Fe—Cd) mixtures
fifth bed: (Ni)+(Fe—Cd), (Fe—Co) mixtures
sixth bed: (Cd), (Co)+(Ni—Cd), (Ni—Co) mixtures

TABLE 3

| | Stabilized speeds | CO in % | $CO_2$ in % | HC in ppm ($C_3H_8$) | $O_2$ in % |
|---|---|---|---|---|---|
| With the original and conventional exhaust unit of the vehicle and without catalytic unit | 667 rev/min | 5.2 | 10.3 | 440 | 1.3 |
| | 1373 rev/min | 1.2 | 13.1 | 150 | 1.4 |
| | 2002 rev/min | 1.3 | 13.3 | 138 | 0.6 |
| With the exhaust unit according to the invention | 674 rev/min | 3.4 | 11.3 | 416 | 1.6 |
| | 1394 rev/min | 0.7 | 13.0 | 143 | 1.8 |
| | 2036 rev/min | 1.2 | 13.7 | 122 | 0.7 |

The results demonstrate that with an exhaust unit comprising a cartridge whose catalytic material is arranged differently to that of the invention, the $CO_2$ content of the exhaust gases at the exit from the unit is substantially the same as at their entry.

We claim:

1. An exhaust unit for an automobile vehicle intended for the chemical treatment of a gaseous mixture in contact with a catalytic material, comprising a body with an entry and an exit for the flow of said mixture, the interior of the body comprising at least one compartment between the entry and the exit of the unit, a treatment receptacle being arranged in one of said at least one compartment, the receptacle being provided with an entry for the gaseous mixture and with an exit for a treated mixture, and a mass of catalytic material arranged in the receptacle and permeable to the passage of the gaseous mixture between the entry and the exit from the receptacle, the catalytic material comprising partially sintered metals, with the exclusion of metallic oxide, the mass of the catalytic material being arranged in a succession of at least two catalyst beds from the entry to the exit of the receptacle, wherein the first bed consists of pure copper and each of the other beds comprises at least one layer of one metal in a pure state, selected from the group consisting of copper, iron, nickel, cobalt, cadmium, and chromium and at least one layer comprising a mixture of two said metals.

2. The unit as claimed in claim 1, wherein in the second catalyst bed the metal in a pure state is selected from the group consisting of copper, nickel, iron and cadmium, and the mixture comprises a member selected from the group consisting of copper and iron.

3. The unit as claimed in claim 2, wherein the mass of the catalytic material is arranged into two catalyst beds, the active substance of the second bed comprising layers respectively of pure copper, pure nickel, and a mixture of copper and nickel.

4. The unit as claimed in claim 2, wherein the catalyst beds comprise at least three catalyst beds, a third said bed comprising a mixture of metals containing at least one metal selected from the group consisting of copper and iron.

5. The unit as claimed in claim 4, wherein the catalyst beds comprise at least four catalyst beds, a fourth said bed comprising a mixture of metals containing at least one metal selected from the group consisting of iron and nickel.

6. The unit as claimed in claim 1, wherein the catalytic material is in the form of particles, such as grains, granules or pellets.

7. The unit as claimed in claim 1, wherein the various catalyst beds constituting the mass of catalytic material are separated from one another by grids.

8. The unit as claimed in claim 1, wherein the mass of the catalytic material is arranged in the form of a stacking of the catalyst beds or any other juxtaposition of said beds.

9. The unit as claimed in claim 1, comprising an assembly wall which delimits an enclosure, within which is arranged the treatment receptacle and which is a plastic sandwich comprising, from the outside inwards, an outer skin made of an impact-resistant laminate, a core of fire-resistant plastic foam and an inner skin of a laminate which is resistant to corrosion, at relatively high temperature.

10. The unit as claimed in claim 1, wherein the catalyst beds additionally comprise, by way of an active substance, at least one noble metal chosen from platinum, palladium and rhodium.

11. The unit as claimed in claim 1, wherein the treatment receptacle constitutes an interchangeable cartridge and the exhaust unit is arranged so as to allow access to said cartridge, and to replace a used cartridge with a new cartridge.

12. An exhaust unit as claimed in claim 1, wherein said body comprises two successive compartments from the entry to the exit of the unit, a filtering material being arranged in a first compartment of said two compartments and said treatment receptacle being arranged in a second compartment.

13. The unit as claimed in claim 12, wherein said filtering material is selected from the group consisting of felt and glass wool.

14. An exhaust unit according to claim 12, wherein said filtering material is formed into consecutive adjacent folds.

15. An exhaust unit for an automobile vehicle intended for the chemical treatment of a gaseous mixture in contact with a catalytic material, comprising a body with an entry and an exit for the flow of said mixture, the interior of the body comprising at least one compartment between the entry and the exit of the unit, a treatment receptacle being arranged in one of said at least one compartment, the receptacle being provided with an entry for the gaseous mixture and with an exit for a treated mixture, and a mass of catalytic material arranged in the receptacle and permeable to the passage of the gaseous mixture between the entry and the exit from the receptacle, the catalytic material comprising partially sintered metals, with the exclusion of metallic oxide, the mass of the catalytic material being arranged in a secession of at least six catalyst beds from the entry to the exit of the receptacle, wherein a first bed consists of pure copper and the other catalyst beds comprise a second said bed comprising pure copper and a copper-nickel mixture, a third said bed comprising pure iron, a copper-nickel mixture and an iron-nickel mixture, a fourth said bed comprising pure iron, an iron-nickel mixture and an iron-cadmium mixture, and a fifth said bed comprising pure nickel, an iron cadmium mixture and an iron-cobalt mixture and a sixth said bed comprising pure cadmium, pure cobalt, a nickel-cadmium mixture and a nickel-cobalt mixture.

* * * * *